UNITED STATES PATENT OFFICE.

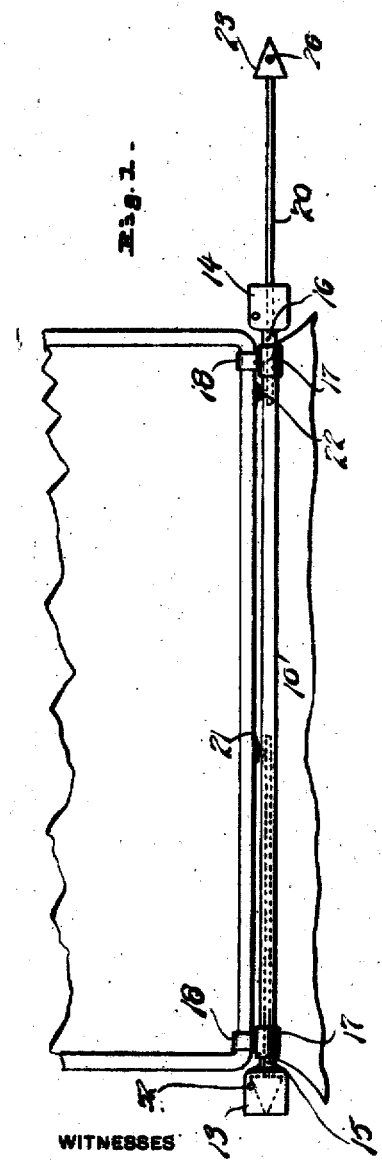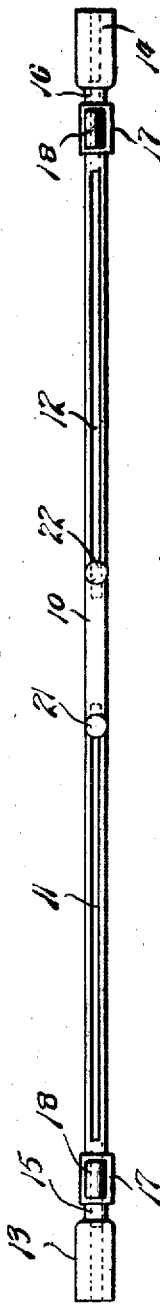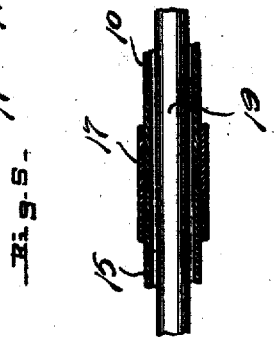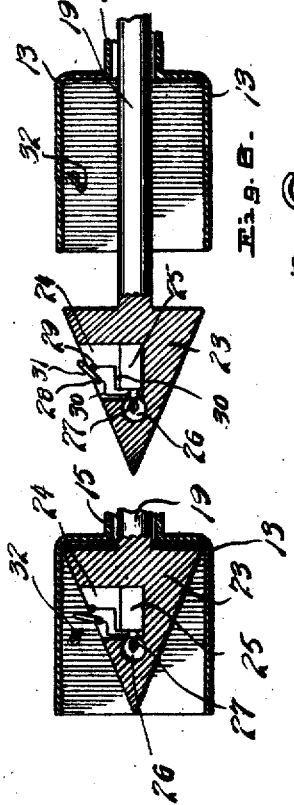

VERNON A. DOTY, OF WEST SPRINGFIELD, MASSACHUSETTS.

AUTOMOBILE-SIGNAL.

1,312,109.   Specification of Letters Patent.   Patented Aug. 5, 1919.

Application filed January 7, 1916. Serial No. 70,865.

*To all whom it may concern:*

Be it known that I, VERNON A. DOTY, a citizen of the United States, residing at West Springfield, in the county of Hampden and State of Massachusetts, have invented certain new and useful Improvements in Automobile-Signals, of which the following is a specification.

My present invention has relation to improvements in automobile signals; and as its primary object, it contemplates the provision of a novel device of this character that is especially designed to be used for the purpose of indicating the direction of the automobile to pedestrians as well as the operators of machines traveling therebehind and which by reason of its novel construction is easy to operate, and may be quickly attached to or detached from the conventional form of automobile.

A further object of my invention is to provide a device of the type in question that is extremely simple in construction, strong and durable, and highly practical from both the standpoint of the manufacturer and the standpoint of the user; and which, it is believed, may be manufactured at a comparatively low cost.

Various other objects and advantages will become apparent during the continuance of the following description.

These objects are accomplished by such means as are shown in their preferred form in the accompanying drawings, described in the following specification and then more specifically pointed out in the appended claim.

In the accompanying drawings wherein like characters designate like parts throughout the several views:—

Figure 1 is a view in side elevation of my invention showing the same as applied to a dash-board and suspended from a wind-shield of an ordinary automobile;

Fig. 2 is a view in top plan of the device;

Fig. 3 is a view in section of one of the signal heads and the cover housing therefor; the head being shown positioned in the housing.

Fig. 4 is a view similar to Fig. 3, but showing the head exteriorly of the housing;

Fig. 5 is a view showing more clearly the manner of assembling the body of the device;

Fig. 6 is a view in cross section showing more clearly the construction of a novel form of bracket that is employed in connecting the body of the device to the respective windshield or other structure of the automobile.

In reducing my invention to practice, I first provide a body structure 10 that is preferably hollow throughout the greater portion of its longitudinal extent and which is provided at suitable points with longitudinally extending receiving slots 11 and 12 respectively. This body structure may be formed of any suitable or desirable material; however, it is pointed out that a hollow metallic rod will suffice.

I now provide suitable cover housings 13 and 14 each of which is open at its free end, as shown in Figs. 3 and 4, while their other ends merge into the sleeve portions 15 and 16; the latter being screw threaded about a portion of their length, as shown in Fig. 5, for a purpose that will subsequently appear. The sleeve portions 15 and 16 above referred to, are preferably made of the same diameter as the body structure 10 whereby a common coupling, such as designated by the numeral 17 may be associated thereabout, for the purpose of obtaining a secure connection. The inner periphery of these bearings 17 are preferably screw threaded as shown to coöperate with the screw threaded portions of the sleeves 15 and 16 and the ends of the body structure 10, thus accomplishing the desired connection. The cover housings being arranged at each end of the body structure, as shown in Figs. 1 and 2, are independently detachable, as is obvious, so that either one may be removed or replaced without in any way affecting the efficiency of the device or necessitating the dismembering of the other housing.

In order to facilitate the attachment of the body structure to certain portions of the automobile upon which it is desired to be used, I provide each of the bearings 17 with suitable brackets 18 (see Fig. 1) which, in the present embodiment, are engaged with the lower rim of the wind-shield. This however is a mere arbitrary feature and other means may be employed to attach the body structure to the automobile, if it is so desired.

I further provide suitable carrying rods 19 and 20 which may be mounted to slide within the body structure and the respective sleeves 15 and 16, the rods being in turn provided with adjustable studs 21 and 22 to project through the slots 11 and 12 of the body structure whereby they may be conveniently manipulated. At their outer ends the rods 19 and 20 are provided with a head portion 23 which, in the present embodiment, is in the form of an arrow head, and of a construction whereby it will normally seat snugly within the respective cover housings 13 and 14. The head 23 above referred to, may be formed of any desirable material and is preferably cut out as at 24 sufficiently to receive an ordinary dry cell 25 and again, laterally, as at 26 to form an opening through which the electric light or lamp 27 may be viewed. Interiorly of the cut out portions 24 of the respective head, I provide binding posts 28 and 29 to which the electrical conductors 30 from the cell 25 may be connected, and a switch arm 31 that projects slightly beyond the cut out portions 24 to close the circuit between the binding posts at certain times to light the light, as is obvious. On the other hand, I provide each of the cover housings 13 and 14 with a transversely arranged actuating member 32, with which the switch arm 31 may be engaged both upon the drawing of the respective head into the cover housing and the removal of the head therefrom. This provides for the opening and closing of the switch and the consequent lighting of the lamp, such as will be presently described. The actuating member 32 above referred to, is mounted to oscillate slightly with respect to the cover housings whereby the switch arm is allowed to pass by the switch-engaging member after closing the latter and after opening the latter.

Upon drawing the respective head 23 into the cover housing, the projecting end of the switch arm 31 will be engaged with the actuating member 32 whereby the switch arm will be swung on its pivotal support so as to break the circuit between the respective binding posts 28 and 29. Thus the circuit through the electric lamp will also be broken. However, upon moving the respective heads from the cover housing, the switch arm will again be engaged by the actuating member and this time moved into a position whereby it will close the circuit between the respective binding posts, and thus the lamp will be lighted. By reason of the cut away portions 24, it will be seen that the cell 25 which in the present embodiment may be in the form of the ordinary hand cell may be removed or replaced with great ease.

The operation of my invention is substantially as follows:—

When traveling upon a straight road or under ordinary circumstances, both of the rods 19 and 20 may be positioned as shown in Fig. 2 whereby the respective head portions 23 will lie within the cover housings 13 and 14. When in this position, as above stated, the switch arm 31 of each of the head members will be in an open position. However, should the operator of the machine desire to turn to the right the arm 20 may be moved to the position shown in Fig. 1, whereby immediately upon movement of the respective head thereof, the switch arm will be moved into a closed position through the instrumentality of the actuating member 32 thereby lighting the respective electric light. While not limiting myself to the specific coloring of the heads 23, it is pointed out that they may be of different colors so as to be of use in the day time without necessitating the lighting of the electric globes. When desired to operate the heads without lighting the globes, the actuating members 32 may be turned into a position whereby they will not be engaged with the respective switch arms during movement of the heads. Furthermore, it will be recognized that the device, as a whole is readily attachable or detachable to or from the automobile and when in place does not in any way interfere with the operation of the machine or obstruct the view of the operator. On the other hand, the operator may actuate the respective arms 19 and 20 without leaving his post of duty and in an easy and expeditious manner.

From the foregoing, it is believed that the advantages and novel features of my invention will be readily understood and, therefore, further detail description is deemed unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claim.

Having thus fully described my invention, what I claim as new and desire to secure by Letters Patent is:—

In a signaling device, an illuminating element, a housing therefor, means for moving said illuminating element from its non-signaling position to its signaling position, a switch arm carried by and projecting above the upper edge of said illuminating element, and an actuating member mounted within the housing adjacent the upper edge of the illuminating element, adapted in the normal operation of the device to contact with the switch arm to effect illumination by said illuminating element at the beginning of movement of the latter to a signaling position, said member being capable of oscillatory movement whereby the same may be positioned so as to allow the said switch arm to pass without contacting therewith.

In testimony whereof I affix my signature in presence of two witnesses.

VERNON A. DOTY.

Witnesses:
WILLIAM E. DOTY,
GRACE E. DOTY.